United States Patent
Vance

(10) Patent No.: US 7,876,445 B1
(45) Date of Patent: Jan. 25, 2011

(54) TWO-PHOTON-ABSORPTION MAGNETO-OPTIC DISPERSION SPECTROMETER

(76) Inventor: Joseph Daniel Vance, 316 Sherman Dr., Scotts Valley, CA (US) 95066

( * ) Notice: Subject to any disclaimer, the term of this patent is extended or adjusted under 35 U.S.C. 154(b) by 0 days.

(21) Appl. No.: 12/496,032

(22) Filed: Jul. 1, 2009

(51) Int. Cl.
*G01B 9/02* (2006.01)
*G01J 3/45* (2006.01)

(52) U.S. Cl. ...................... 356/453; 356/491
(58) Field of Classification Search .......... 356/451, 356/453, 491
See application file for complete search history.

(56) References Cited

U.S. PATENT DOCUMENTS

| | | | | |
|---|---|---|---|---|
| 3,652,926 A | * | 3/1972 | Brun | 324/304 |
| 4,040,718 A | * | 8/1977 | Bjorklund et al. | 359/241 |
| 4,165,937 A | | 8/1979 | Murayama et al. | |
| 4,779,279 A | * | 10/1988 | Brown | 372/37 |
| 7,102,451 B2 | * | 9/2006 | Happer et al. | 331/94.1 |
| 7,414,786 B2 | * | 8/2008 | Brown et al. | 359/501 |
| 7,439,814 B2 | * | 10/2008 | Happer et al. | 331/3 |
| 2003/0123051 A1 | * | 7/2003 | McGrew | 356/72 |
| 2005/0185188 A1 | * | 8/2005 | McGrew | 356/450 |
| 2007/0159694 A1 | * | 7/2007 | Brown et al. | 359/489 |
| 2009/0207470 A1 | * | 8/2009 | Vance | 359/241 |

OTHER PUBLICATIONS

Liao, P.F., et al., "Polarization rotation effects of atomic sodium vapor", Physical Review A, May 1977, pp. 2009-2018, vol. 15, No. 5.

* cited by examiner

*Primary Examiner*—Patrick J Connolly

(57) ABSTRACT

A tunable optical spectrometer is disclosed that includes a medium configured to perform polarization rotation within a frequency band on a linearly polarized test beam, wherein the medium is circularly birefringent, and wherein the polarization rotation is achieved based on two-photon-absorption. The medium includes a gaseous substance, a reference laser beam of circular polarization and a longitudinal magnetic field. The test beam propagates through the medium twice, once in the same direction as the magnetic field, and once in the opposite direction of the magnetic field. The test beam undergoes polarization rotation an amount that depends upon the frequency of the test beam.

3 Claims, 4 Drawing Sheets

TWO-PHOTON-ABSORPTION MAGNETO-OPTIC DISPERSION SPECTROMETER

FIELD OF THE INVENTION

This invention relates to optical spectrometers utilizing circular birefringence to rotate the linear polarization of light, and more particularly to deducing the photon wavelength based on an analysis of light polarization after propagating light through the circularly birefringent medium.

BACKGROUND OF THE INVENTION

High resolution measurement of light frequency from incoherent sources typically makes use of cavity interference such as Fabry Perot interferometers and gratings, or absorption lines from some medium. Interferometers such as a Fabry Perot or gratings are expensive and have low acceptance angles, meaning the deviation from the desired angle at which the light enters the interferometer has very little tolerance. Moreover, for such interferometers increasing the spectral resolution lowers the transmission of the signal (reduces the number of photons included in the signal). Absorption line mediums (e.g., iodine, potassium and sodium) require some atomic or molecular transition in the medium, and they only occur at discrete and fixed frequency locations. Additionally, since absorption lines absorb light, they deplete the strength of the signal being measured.

Magneto-optic spectrophotometers can be used to measure frequency, but they only distinguish light near a particular absorption line from light that is not near a particular absorption line, which provides very low frequency resolution in comparison to the current invention.

DETAILED DESCRIPTION OF THE INVENTION

Several drawings illustrate physical the attributes of a magneto optic dispersion spectrometer, and quantities that may be manifested with its construction, in accordance with embodiments of the present invention. Examples are described that have particular gaseous mediums, transitions, wavelengths of complimentary light pairs, etc. for purposes of illustration. However, it should be noted that the choices of particular gaseous medium and particular transitions are abundant. Also, while concomitant to the chosen transitions, the wavelengths of the light pairs, test beam and reference beam, have wide latitude of choice upon a continuum. Thus it is recognized that the apparatus and means described herein may vary without departing from the basic underlying concepts of the invention.

The current invention is an optical spectrometer based on dispersion from two-photon-absorption. An optical spectrometer measures some property of light, typically intensity as a function of wavelength. A dispersion spectrometer utilizes a rapidly changing electric susceptibility to demarcate intensity at a particular wavelength. Embodiments of the current invention are based the creation of a medium where in selected frequency regions the dispersion changes rapidly but absorption is mostly absent. The frequency region between two absorption lines has these properties and is exploited herein. One way to create two absorption lines is to apply a magnetic field to an atomic vapor and split a single absorption line into two absorption lines.

Light that propagates through a gaseous medium is preferentially absorbed when its energy corresponds to a particular atomic transition. This preferential absorption (otherwise known as resonance absorption) also affects light phase, or dispersion. The electric susceptibility is used to describe both the absorption and dispersion effects. Whenever the real portion of the electric susceptibility, for each circular polarization state of light are different, then the medium becomes circularly birefringent. A linear polarized beam will undergo polarization rotation to another linear polarized state while traveling through a circular birefringent medium. It will be shown that the electric susceptibilities for the test beam that manifest from two-photon-absorption in an gaseous medium can be manipulated to bring about circular birefringence that changes rapidly enough to make an ultra high resolution spectrometer.

Figure 1:
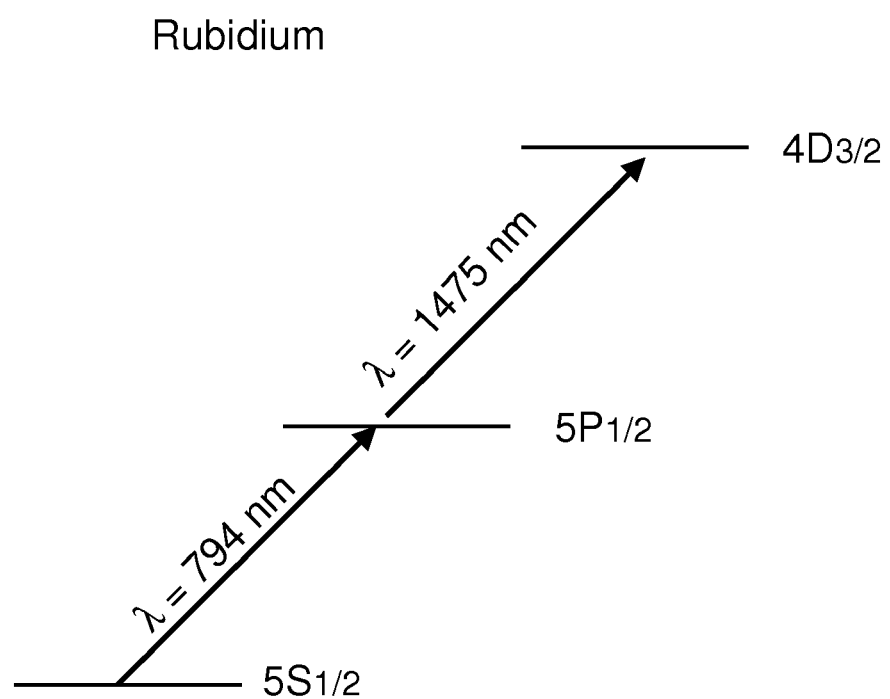
FIG. 1 is a diagram of rubidium spectra, in accordance with one embodiment of the present invention.

A circular birefringent medium in the present invention accomplishes circular birefringence based on a physical phenomena called two-photon-absorption. Consider an atomic transition from a ground state (lowest allowed energy state of an atom) to an intermediate excited state, which can occur with the absorption of a single photon. A single photon resonance is a photon frequency bandwidth where the energy of the photon matches an allowed atomic transition. Furthermore, consider another transition from the intermediate excited state to another still higher energy state, a final excited state that can occur with the absorption of a single photon. Two-photon-absorption is the direct transition from the ground state to the final excited state, avoiding the intermediate state, by the simultaneous absorption of two photons. A two-photon-transition identifies the states of the substance involved in two-photon-absorption. A two-photon-absorption line is a frequency bandwidth of light that can be absorbed by the process of two-photon-absorption. FIG. 1 is a diagram illustrating the process of two-photon-absorption, in accordance with one embodiment of the present invention.

In the case of two-photon-absorption, the only restriction upon the energy of the photons is that the sum of their energies match the total energy of the atomic transition:

$$E_{excited} - E_{ground} = \frac{hc}{\lambda_1} + \frac{hc}{\lambda_2} \qquad \text{Equation 1}$$

Equation (1) demonstrates that there is some freedom of choice of wavelengths $\lambda_1$ & $\lambda_2$. Conservation of energy requires only that the sum of the two photon energies match the two photon transition, which is a considerably relaxed condition compared to a sequential transition, where each photon energy individually matches the transition energy.

This enables tuning of the spectrometer to different wavelengths. In this manner, the two-photon-absorption line frequency location is tunable simply by tuning the reference light frequency. Single photon resonance is not required, nor excluded in the two-photon-absorption process.

Practical two-photon-absorption involves the rigid application of angular momentum selection rules. Because conservation of angular momentum is never violated, selection rules place restrictions upon the interaction of light with matter, and are exploited to produce circular birefringence. In units of $\hbar$, all photons have an angular momentum. Since angular momentum is a vector, it has magnitude and direction. A photon with right-handed circular polarization has an angular momentum direction opposite to the propagation direction, and a magnitude of one. A photon with left-handed circular polarization has an angular momentum direction in the same direction as the propagation direction, and a magnitude of one. Circularly polarized light is in a stationary or eigen state. Linearly polarized light on the other hand has angular momentum of one, but the direction is in a super position of eigen states. Upon absorption of a photon the angular momentum vector is transferred into the system that absorbs it. But in the case of linearly polarized light, the direction of the transferred angular momentum vector is equally likely to be in the forward direction as the backwards direction.

For atomic dipole transitions, or allowed transitions, there is a change in magnitude of angular momentum between the initial state and final state of one, with the emission or absorption of a single photon. Consider a sequence of two dipole transitions of an atom. Beginning with lowest energy state of the atom, the ground state, a transition can occur to an excited state, denoted here as an intermediate excited state, with absorption of a photon. Then another transition can occur from the intermediate excited state to a final excited state with another photon absorption. By vector addition, angular momentum that the ground state and the final excited state have may differ by zero or two (e.g., 1−1=0; 1+1=2). Now consider the same situation except that instead of sequential absorption of two photons there is simultaneous absorption of two photons, denoted two-photon-absorption. If the angular momentum of the atom's ground state and final excited state are identical, then two-photon-absorption can occur only with a photon pair that have angular momentum vectors aligned in opposite directions. Similarly, if the angular momentum of the atom's ground state and the final excited state differ by two, then two-photon-absorption can occur only with a photon pair that have angular momentum that is aligned in the same direction. Extrapolating from single photons to beams, all the photons of a circularly polarized beam of light have their angular momentum vectors aligned in the same direction.

Figure 2:
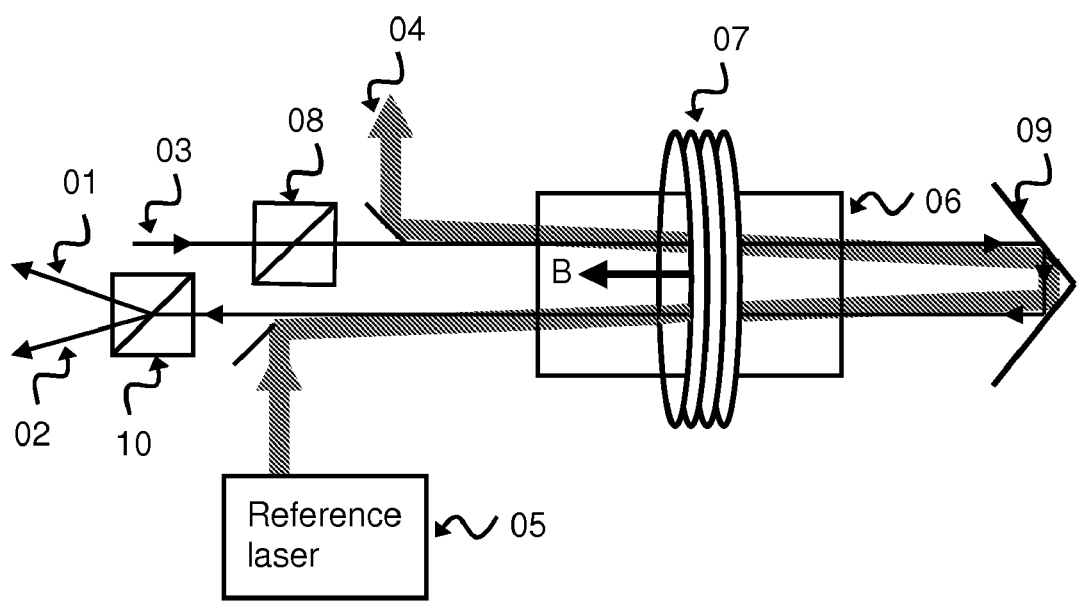
FIG. 2 shows the basic configuration of a two-photon-absorption magneto-optic dispersion spectrometer in accordance with one embodiment of the present invention.

Applying the above concepts we can begin to explain the present invention. FIG. 2 illustrates the major components that operate as an optical spectrometer, in accordance with one embodiment of the present invention. A gaseous substance involved in the two-photon-absorption process is contained in cell 06. For example cell 06 may be a transparent vessel that contains rubidium, some of which will be in a vapor state. A heater and a temperature controller may be implemented to control the temperature of the vapor. An example set of states and corresponding transition energy wavelengths for the Rubidium are: $5S_{1/2}$->$5P_{1/2}$->$4D_{3/2}$ with 794 nm and 1475 nm respectively. Thus a reference laser may have a wavelength near 794 nm that provides a circularly polarized reference beam propagating through cell 06. There will then be a two-photon-absorption line for a test beam 03 line near 1475 nm. Since the reference beam 04 is circularly polarized, the selection rules dictate there will be a two-photon-absorption line for only one circularly polarized component of test beam 03. Thus a two-photon-absorption line influences one circular component of the test beam 03, and the other circular component is unaffected making the medium circularly birefringent.

An absorption line affects light not only by absorption, but affects light phase as well. The electric susceptibility is used to describe both effects. To quantify the birefringence, the electric susceptibility can be used and is defined here in terms of dielectric polarization density:

$$\vec{P} = \epsilon_o \chi \vec{E} \qquad \text{Equation 2}$$

Where the electric susceptibility $\chi$ is the proportionality constant linking the electric field of the test beam 03 to the dielectric polarization, and $\epsilon_o$ is the permittivity of free space. The electric susceptibility $\chi$ is dimensionless and also a complex quantity, and is expressed in component form as:

$$\chi = \chi' + i\chi'' \qquad \text{Equation 3}$$

The polarization of test beam 03 may be linear, but if not a linear polarizer 08 may be implemented to produce linear polarization. Using a circular polarization basis to express the linear polarized test beam 03, with some minor approximations and removing time dependence, the electric field of the test beam 03 after traveling a distance/within the birefringent medium inside cell 6 is:

$$\vec{E}(l) = \begin{array}{l} -\frac{E_o}{\sqrt{2}} \exp\left[i\left\{\frac{\omega}{c}\left(1 + \frac{\chi'_+}{2} + i\frac{\chi''_+}{2}\right)l\right\}\right] \hat{+} \\ + \frac{E_o}{\sqrt{2}} \exp\left[i\left\{\frac{\omega}{c}\left(1 + \frac{\chi'_-}{2} + i\frac{\chi''_-}{2}\right)l\right\}\right] \hat{-} \end{array}$$

Where $\omega$ is the angular frequency and c is the speed of light. Equation (5) demonstrates that $\chi'$, the real portion of the electric susceptibility, affects phase, while $\chi''$, the imaginary portion of the electric susceptibility, is related to absorption. The subscripts, plus and minus, attached to the susceptibilities identifies to which circular polarization state the electric susceptibility applies to: right and left handed polarization, respectively. Notice that the field vector is written in a circular polarization basis.

Because both effects of absorption and dispersion are interdependent it can be difficult to produce a medium where there is rapidly changing dispersion without absorption. If there is two absorption lines however, the frequency region in between the absorption lines does have the desired attributes of rapidly changing dispersion and absence of absorption.

One way to create two absorption lines is by introducing a magnetic field. A longitudinal magnetic field may have one of two directions relative to test beam 03: a longitudinal magnetic field has a direction the same as the propagation direction of test beam 03, or alternatively, a magnetic field that has a direction opposite to the direction of propagation of test beam 03.

A longitudinal magnetic field will shift the frequency location of the two-photon-absorption line up or down depending upon the circular polarization state of the test beam 03. A frequency up shifted line for one circular polarized component of test beam 03 and a frequency downshifted line for the other circular polarized component of test beam 03.

Figure 3:
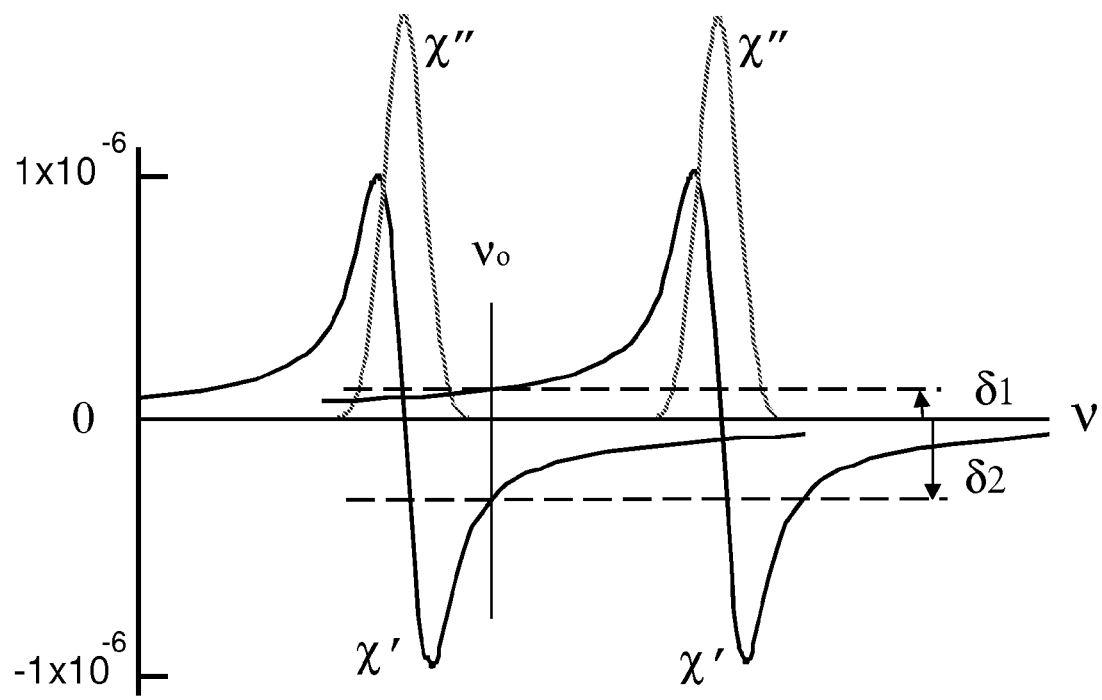
FIG. 3 shows the real ($\chi'$) and imaginary ($\chi''$) portions of the electric susceptibility near a split absorption line caused by a magnetic field. The figure also shows the difference in susceptibility between each circularly polarized component of a test beam for test beam paths propagating with and against a magnetic field shifted susceptibility in accordance with one embodiment of the present invention.

Referring to FIG. 2, the test beam 03 may propagated through a first linear polarizer 08. Then the test beam 03 is propagated through cell 06. The cell 06 contains a gaseous substance and the test beam 03 overlaps with the circularly polarized reference beam 04, creating a birefringent medium for the test beam 03. In addition, a magnetic field supplied by magnet 07 permeates the gaseous substance and the shifts frequency location of the two-photon-absorption line for the circular polarized component of test beam 03. The shifted two-photon-absorption line causes a polarization rotation of test beam 03. Then the test beam is reflected upon a minor 09 and transmitted back through the cell 06 a second time. The test beam 03 undergoes polarization rotation again, but is impacted by an oppositely shifted two-photon-absorption line, and is rotated in the opposite direction. The polarization change of the test beam after traveling through the birefringent medium twice is used to determine frequency of test beam 03. The closer the frequency of test beam 03 is to one of the two-photon-absorption lines, the more it is influenced and rotated by that particular two-photon-absorption line. FIG. 3 graphically illustrates this point. The amount of rotation of the test beam 03 with nominal frequency $v_0$ on each pass through the cell 06 depends upon the difference between the real portion of the susceptibility for each polarization state, as indicated by the arrows on the far right labeled $\delta_1$ & $\delta_2$ of the figure indicating magnitudes and directions of the difference in susceptibility.

Figure 4:
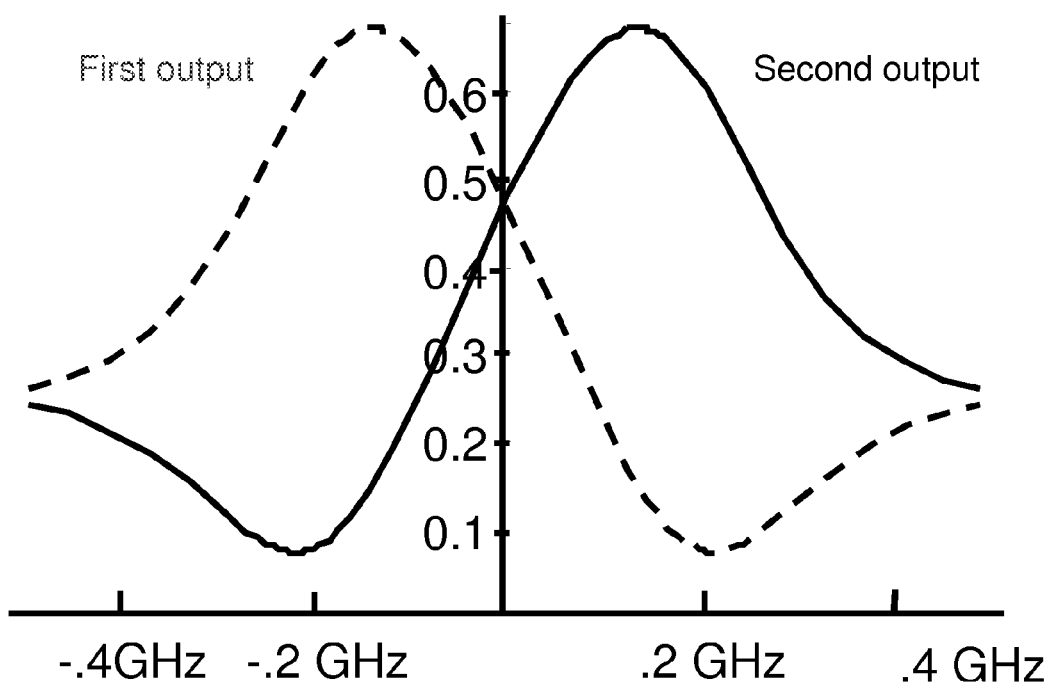
FIG. 4 is a plot of transmission spectra into two separate channels, a first output and second output, in accordance with one embodiment of the present invention.

A further embodiment of the present invention may include a polarizing beam splitter 10 such as a Wollaston prism. The polarizing beam splitter accepts test beam 03 after it has traveled through the cell twice and splits the test beam 03 into two separate beam channels, a first output beam 01 and a second output beam 02. Typically the orientation of the polarizing beam splitter 10 relative to the polarization state of the test beam 03 before entering the cell 06 will be at 45 degrees but the angle may be varied. Suppose that the orientation of the polarizing beam splitter 10 is forty-five degrees relative to the polarization of test beam 03 before it propagates through cell 06. In the absence of the circularly birefringent medium, test beam 03 will be evenly split because each output, first output 01 and second output 02, competes equally for photons due to the forty-five degree orientation. However, if the test beam 03 travels through the circularly birefringent medium twice, the polarization of the light will be rotated clockwise by while traveling through in one direction and counterclockwise while traveling the opposite direction. The amount of polarization rotation from each pass through cell 06 will depend upon the test beam 03 frequency. In turn, the total overall polarization rotation change, direction and magnitude, of test beam 03 will depend upon its frequency. So the test beam 03 light will preferentially choose one exit path or the other, first output 01 or second output 02, of the polarizing beam splitter 10 depending upon its frequency. Mathematically, the transmission into each channel through the polarizing beam splitter will be:

Define a coordinate system with $\hat{z}$ axis assigned to the propagation direction, and $\hat{x}$ assigned to the polarization direction of test beam 03 before it enters the cell 06 for the first time. If the polarizing beam splitter is oriented 45 degrees relative to $\hat{x}$, the first output 01 and second output 02 polarization directions can be expressed as $\hat{x} \pm \hat{y}$ respectively. The transmission of test beam 03 into first output 01 and second output 02 will be:

$$T = \frac{\left| \vec{E} \cdot \left( \frac{\hat{x} \pm \hat{y}}{\sqrt{2}} \right) \right|^2}{E_o^2} \quad \text{equation 6}$$

$$T = \frac{1}{4} \left[ \begin{array}{c} \exp\left(-\frac{\omega}{c}\chi_u'' l\right) + \exp\left(-\frac{\omega}{c}\chi_d'' l\right) \pm \\ 2 \exp\left(-\frac{\omega}{c}\frac{\chi_u'' + \chi_d''}{2} l\right) \sin\left(\frac{\omega}{c}\frac{\chi_u' - \chi_d'}{2} l\right) \end{array} \right] \quad \text{equation 7}$$

where the subscripts u and d on the susceptibilities refer to up shifted susceptibility and downshifted susceptibility respectively, and the plus/minus sign refers to first output 01 or second output 02. FIG. 4 demonstrates the transmission into each output channel for one example of one embodiment of the current invention.

If the signal magnitude of the first output beam 01 is divided by the signal magnitude of the second output beam 02, the ratio can determine the frequency of the light. In this way the spectrometer can be used to demodulate information from frequency modulated laser beams. A laser communication system can be built by frequency modulating a communication signal upon the test beam 03, and transmitting it to a receiver containing a demodulator to decode the information as described above.

Another use for the spectrometer is to recover the shape of the test beam 03 when it is a distribution of frequencies. Consider that test beam 03 may begin as a laser beam or laser pulse and then is scattered off of some object that changes the frequency distribution. Further consider that each first output beam 01 and second output beam 02 are an integration of the distribution of test beam 03 multiplied by the probability of capture into a particular output, integrated over frequency. If the test beam 03 is frequency scanned, then signals at each first output beam 01 and second output beam 02 at a particular location along the scan represent an integration or transform over a different portion of the distribution. The frequency distribution of test beam 03 can then be recovered by comparison of transforms obtained at different frequency locations as scanning occurs, to transforms from known beam shape at each of those different frequency locations.

In the above descriptions, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above descriptions are intended to be illustrative, and not restrictive. Many other embodiments will be apparent to those of skill in the art upon reading and understanding the above description, including for instance propagating the test beam 03 through two separate birefringent mediums instead of propagating it through one birefringent medium twice. An embodiment using two birefringent mediums is declared here to be within the scope of equivalents. The scope of the invention should, therefore, be determined with reference to the appended claims, along with the full scope of equivalents to which such claims are entitled.

What is claimed is:

1. A tunable optical spectrometer, acting upon a test beam, comprising:
   (a) a gaseous substance;
   (b) a circularly polarized reference laser beam supplied by a reference laser;
   wherein the gaseous substance and circularly polarized reference beam combine to form a birefringent medium as a result of a two-photon-absorption line for one circularly polarized component of the test beam;
   whereby the test beam polarization is rotated as it propagates through the birefringent medium;
   (c) a magnetic field supplied by a magnet that permeates the gaseous substance, shifting the frequency location of the two-photon-absorption line;
   wherein the test beam propagates through the birefringent medium twice, once where the test beam propagates through birefringent medium in a direction predominately the same as the direction of the magnetic field, and once where the test beam propagates through the birefringent medium with a propagation direction predominately opposite to the direction of the magnetic field;
   whereby the polarization state of the test beam after propagating though the birefringent medium twice, relative to polarization state of the test beam before propagating through the birefringent medium, is dependent upon test beam frequency.

2. The tunable optical spectrometer of claim 1, further comprising:
   a polarizing beam splitter;
   wherein the polarizing beam splitter accepts the test beam after it propagates through the gaseous medium twice and splits the test beam into two separate beams, apportioning the test beam into a first output beam and a second output beam according to test beam polarization.

3. The tunable optical spectrometer of claim 1 or 2 further comprising:
   a linear polarizer;
   wherein the test beam propagates through the linear polarizer before entering the gaseous medium, to polarize the test beam into a linear polarization state.

* * * * *